US012336496B2

(12) United States Patent
Eckstein, Sr.

(10) Patent No.: US 12,336,496 B2
(45) Date of Patent: Jun. 24, 2025

(54) LITTER BOX SCOOP WITH BEVEL-EDGE SCRAPER

(71) Applicant: Joan Eckstein, Sr., Irving, TX (US)

(72) Inventor: Joan Eckstein, Sr., Irving, TX (US)

( * ) Notice: Subject to any disclaimer, the term of this patent is extended or adjusted under 35 U.S.C. 154(b) by 519 days.

(21) Appl. No.: 17/731,426

(22) Filed: Apr. 28, 2022

(65) Prior Publication Data

US 2023/0345902 A1 Nov. 2, 2023

(51) Int. Cl.
*A01K 1/01* (2006.01)

(52) U.S. Cl.
CPC ................... *A01K 1/0114* (2013.01)

(58) Field of Classification Search
CPC ....... A01K 1/0114; A01K 23/005; B07B 1/02
USPC ............. 294/1.3, 1.4, 1.5, 176, 179
See application file for complete search history.

(56) References Cited

U.S. PATENT DOCUMENTS

| | | | | | |
|---|---|---|---|---|---|
| D314,254 | S | * | 1/1991 | Gordon | 294/1.3 |
| 5,918,922 | A | * | 7/1999 | Lathrop | G01F 19/002 |
| | | | | | D10/46.2 |
| 6,022,058 | A | * | 2/2000 | O'Rourke | B07B 1/02 |
| | | | | | 294/1.3 |
| 6,039,368 | A | * | 3/2000 | Kowalczyk | A01K 1/0114 |
| | | | | | 294/1.3 |
| 6,312,029 | B1 | * | 11/2001 | Renforth | A01K 1/0114 |
| | | | | | 294/1.3 |
| 6,578,807 | B1 | * | 6/2003 | Lipscomb | A01K 1/0114 |
| | | | | | 248/314 |
| 7,523,973 | B2 | * | 4/2009 | Lin | A01K 1/0114 |
| | | | | | 294/1.3 |
| D659,916 | S | * | 5/2012 | Myerson | D30/162 |
| D679,876 | S | * | 4/2013 | Teren | D30/162 |
| D815,782 | S | * | 4/2018 | Leick | D30/162 |
| D895,910 | S | * | 9/2020 | Wendling | D30/162 |
| 2019/0076880 | A1 | * | 3/2019 | Eckstein, Sr. | A01K 1/0107 |
| 2019/0289811 | A1 | * | 9/2019 | Veness | A01K 1/0114 |
| 2022/0248630 | A1 | * | 8/2022 | Michelle | A01K 1/0114 |

* cited by examiner

*Primary Examiner* — Paul T Chin
(74) *Attorney, Agent, or Firm* — Thompson Patent Law Offices PC

(57) ABSTRACT

A scoop device designed to allow the user to easily segregate urine clump or balls and feces, lift, discard, and wash the device for further use, is disclosed. The scoop device comprises a filter basket, a narrowed wall which includes raised ribs, a beveled scraper, and a handle. The filter basket and beveled scraper, are coated by a non-stick material. The filter basket is a spatula shaped end, positioned between the handle and the beveled scraper end in the scoop device. The filter basket is further extended towards to form the flat beveled scraper configuration in the scoop device. The filter basket and the beveled scraper comprises one or more openings that prevent the scoop device from capturing loose litter material. Further, the scraper of the scoop device is beveled and sharpened to allow loosening of the material such as urine clump or feces, inadvertently adhering to the sides of the litter box.

6 Claims, 7 Drawing Sheets

LITTER BOX SCOOP WITH BEVEL-EDGE SCRAPER

BACKGROUND OF THE INVENTION

A. Technical Field

The present invention generally relates to a scoop. More specifically, the present invention relates to a scoop device for use with an improved litter box scraper for pet animals, especially cat.

B. Description of Related Art

Devices for the convenient removal, carrying and disposal of animal's feces or are known of but not widely used by urban pet animal owners. As far back as people have kept cat as pets, it has been undesirable to see and smell cat dung in any public or private place. The environmental awareness on picking up pet animal's feces has become the socially accepted norm as a necessary duty of the pet animal owner and in some cased enforced by law. In cities, cat waste left in public poses health and aesthetic concerns to arise. As a result, collection of cat waste is probably the worst part of routine pet maintenance and can be an extremely undesirable experience.

Generally, a common method of choice for removing said offensive material is to carry a thin plastic grocery store bag to the site and grab the excreta in the palm of one's hand. The bag being prearranged backwardly over the hand so that one may grab the waste, then fold the bag back away from the hand and tie the bag. The unpleasant task of collection being completed, the task of removal is achieved by carrying the bag containing the waste to an outdoor waste bin or to their home garbage container. In some families, some members, often the younger ones, of the household will refuse to pick up the family cat dung basically in-hand with only a thin plastic bag between hand and waste.

Nowadays, a few variations of this devices have come on the market in attempts to assist the cat owner in collection and removal of cat waste while minimizing all undesirable aspects of the experience. These devices are designed to eliminate the direct hand manipulation of the waste and puts the task at an extended distance so that the handling, visual and olfactory experiences are less offensive. Currently, the cat owner or caregiver places a litter box in a location within the home to allow the cat to urinate and defecate in a contained location. The litter box is typically filled with clay based and carbon infused litter, which absorbs the urine, forming a 'ball' that isolates the ammonia in cat urine from the ambient air. The cat feces is isolated and the moisture within is extracted over time, leaving a fine layer of clay surrounding the dried, an easier to handle, feces. Removing the clumps of urine can result in their breaking apart, releasing a horrible ammonia odor into the ambient air. If the litter level becomes low, the cats can urinate in one location, which forms a very hard to remove clump, often requiring considerable scraping and cleaning effort to restore the litter box to an acceptable condition.

Therefore, there is a need for a unique design of a cat or any animal's scoop device that is reduced in size, and incorporated with a scraper and coating to enhance handling, hygiene, and overall health and wellness of the cat owner environment. Further, the scoop device must be universally used with all types of litter box.

SUMMARY OF THE INVENTION

The present invention relates to a feline hygiene device, which is designed to allow the user to easily segregate urine clump or balls and feces, lift, discard, and wash the device for further use. In an embodiment, the device is a stainless steel scoop provided with one or more openings to allow the loose litter material to fall through back into the litter box, while the urine balls and feces are retained within the scoop or scoop device. In some embodiments, the device could be coated by a non-stick material such as Teflon®, etc. The non-stick coated device could be easily flushed in the toilet bowl, dried and then stored for further usage. The device is further provided with a handle, which is formed using dense foam material that is uncompressible, and non-slip outer surface providing optimum level of grip to the user. Further, the handle comprises an opening at an end that allow it to be hung up in close proximity to the litter box.

In one embodiment, the scoop device comprises a filter basket, and a beveled scraper. The filter basket and beveled scraper, or scraper are coated by a non-stick material such as, Teflon®, etc. The filter basket is a spatula shaped end, positioned between the handle and the beveled scraper end in the scoop device. The filter basket is further extended towards, and forms the flat beveled scraper configuration in the scoop device. The filter basket and the beveled scraper comprises one or more openings that prevent the scoop device from capturing loose litter material. The openings further allow ease in capturing urine balls and feces. Further, leading edge, or end of the scraper of the scoop device is beveled and sharpened to allow loosening of the material such as urine clump or feces, inadvertently adhering to the sides of the litter box.

In one embodiment, the scoop device is provided with a scraper and a scoop that allows gentle handing of the feces and urine balls, so the removal from the litter box does not release extra ammonia or feces odor. The front edge of the scoop device is beveled and sharpened to allow easy removal of adhered clumps at the edge or bottom of the litter box. After removal of the adhered clumps, the scoop shape allows the undesirable material to be collected in the basket portion, the loose litter to fall through the openings without vigorous shaking, and then it can be transported and discarded. After use, the non-stick surface can be rinsed, removing all the loose material on the device. After a drip dry, the scoop device could be hung up near the litter box, using the opening in the end of the handle, until the next use. The dense foam, non-slip, non-absorbent handle allows easy use of the scoop device without fatigue or discomfort.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
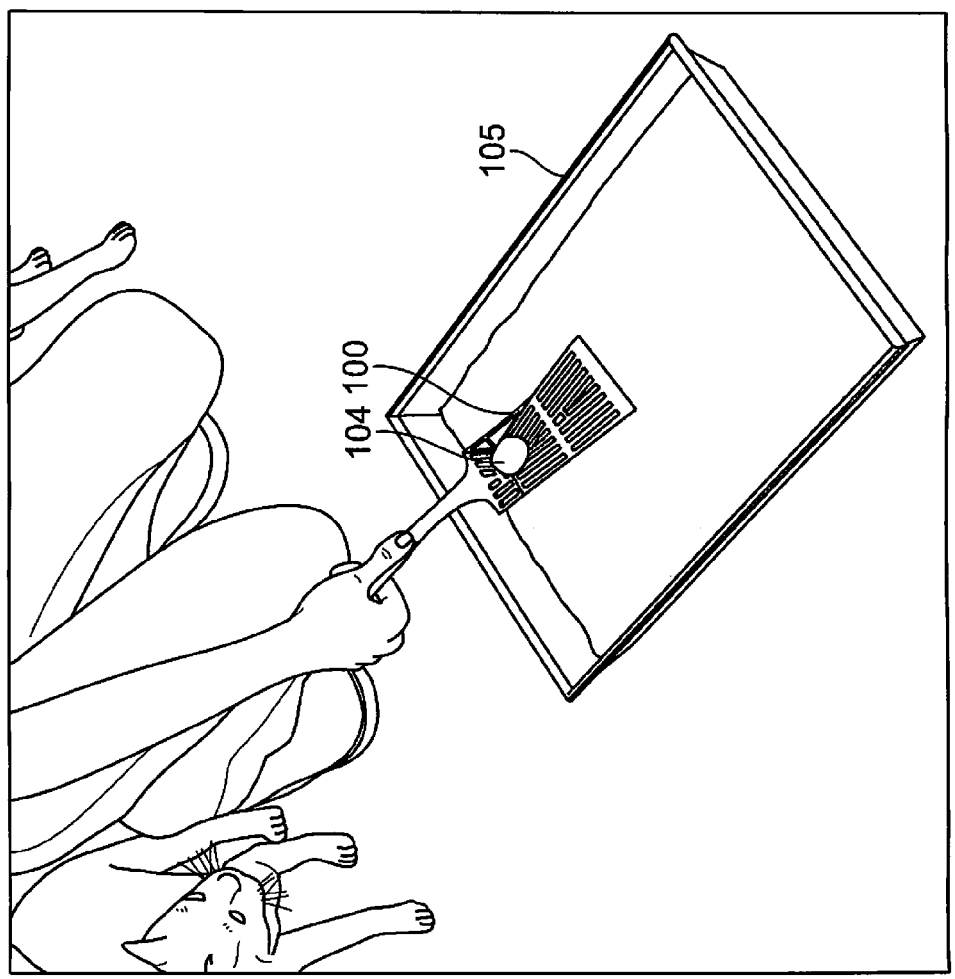
FIG. 1 shows a perspective view of a scoop device handled by a user from the litter box, in an embodiment of the present invention.

Referring to FIG. 1, a perspective view of a scoop device 100 handled by a user from a litter box 105, especially cat litter box, is disclosed, in an embodiment of the present invention. In one embodiment, the scoop device 100 is an improved and possess combined functionality of scraper and scooper in the litter box 105. The device 100 combines the efficiency of a scraper 110 (shown in FIG. 2) with a filter basket 115 (shown in FIG. 2) of a scoop device 100 to keep a cat litter box 105 clean, free of odors and minimizing bacterial build up. Smaller scale of the scoop device 100 allows a user to clean it in a common household toilet by the flushing water action of the toilet. The scoop device 100 is designed to extract the urine ball 104 from the litter with a reduced chance of breaking the ball 104. Further, the scoop device 100 is coated by a non-stick material, which allows ease in extraction of materials such as urine balls or clump, or feces 104 etc., from the litter box 105 without sticking to the device 100 and the built-in scraper 110 permits the user ease in cleaning of the sides and base of the litter box 105.

Figure 2:
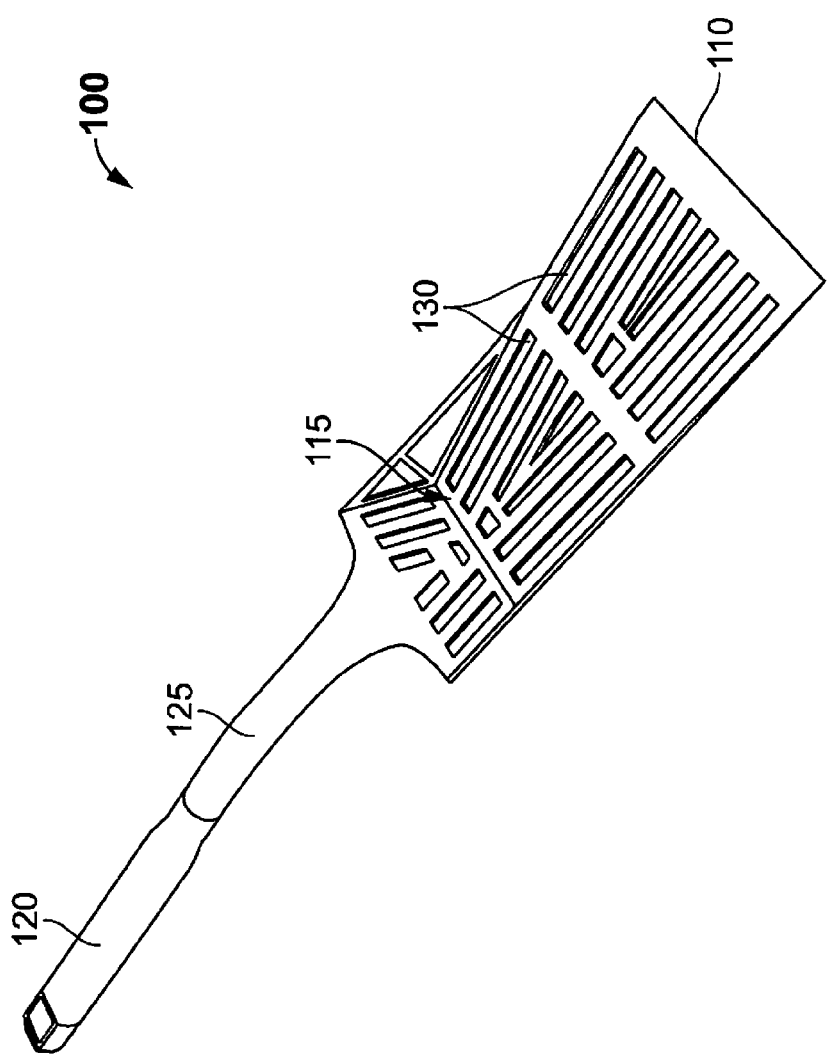
FIG. 2 illustrates a top perspective view of a scoop device, in an embodiment of the present invention.

Referring to FIG. 2, a top perspective view of a scoop device 100, comprises a beveled scraper 110, a filter basket 115, and a handle 120. In one embodiment, the filter basket 115 and beveled scraper, or scraper 110 are coated by a non-stick material such as, Teflon®, etc. The device 100 is further provided with a handle 120, which is formed using dense foam material, for example, ethylene-vinyl acetate material, which is uncompressible, and non-slippage outer surface coating provides optimum level of grip to the user. Further, the handle 120 comprises an opening 130 at an end that allow it to be hung up in close proximity to the litter box.

Figure 3:
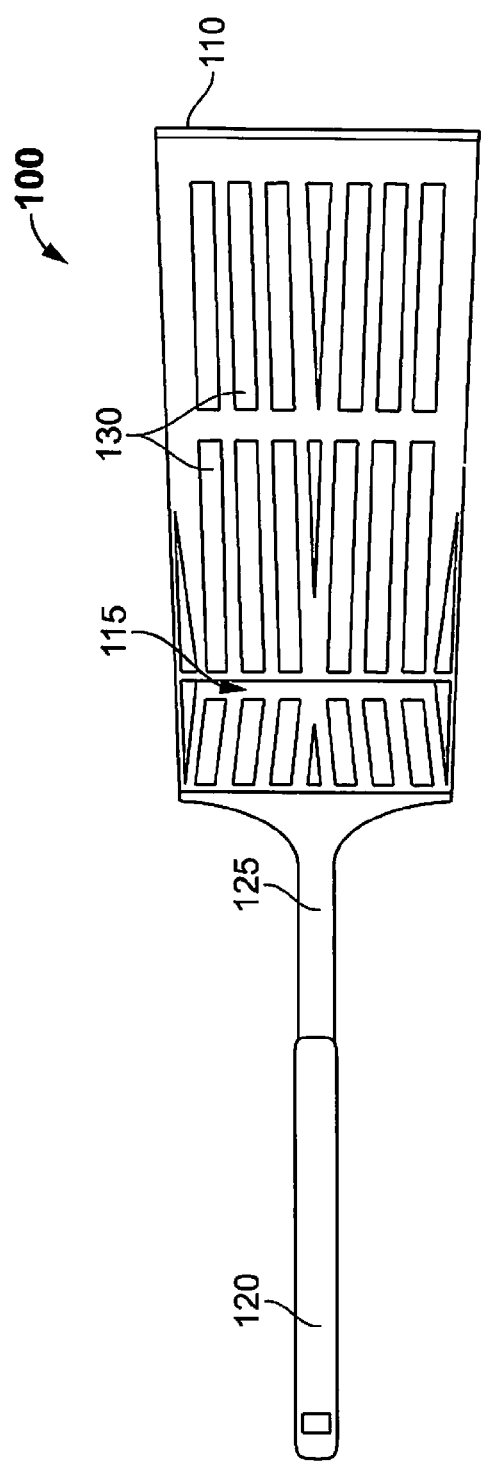
FIG. 3 shows a top view of a scoop device, in an embodiment of the present invention.

Referring to FIG. 3, a top view of a scoop device 100 is disclosed, in an embodiment of the present invention. In an embodiment, the device 100 is a stainless steel scoop provided with one or more openings 130 to allow the loose litter material to fall through back into the litter box, while the urine balls 104 or feces are retained within the scoop or scoop device 100. In some embodiments, the device 100 could be coated by a non-stick material such as Teflon®, etc. The non-stick coated device 100 could be easily flushed in the toilet bowl, dried and then stored for further usage.

In one embodiment, the scoop device 100 is provided with a scraper 110 that allows gentle handing of the feces or urine balls 104, so the removal from the litter box does not release extra ammonia or feces odor. The front edge of the scoop device 100 is beveled and sharpened to allow easy removal of adhered clumps at the edge or bottom of the litter box. After removal of the adhered clumps, the scoop shape allows the undesirable material to be collected in the basket 115, the loose litter to fall through the openings 130 without vigorous shaking, and then it can be transported and discarded. After use, the non-stick surface can be rinsed, removing all the loose material on the device 100. After a drip dry, the scoop device 100 could be hung up near the litter box, using the opening 130 in the end of the handle 120, until the next use. The dense foam, non-slip, non-absorbent handle 120 allows easy use of the scoop device 100 without fatigue or discomfort. In some embodiment, a metal connector 125 incorporated for connecting the handling and the scoop. The scoop is gracefully shaped for a pleasing look, and further provides considerable lateral strength to the filter basket 115 of the scoop device 100.

Figure 4:
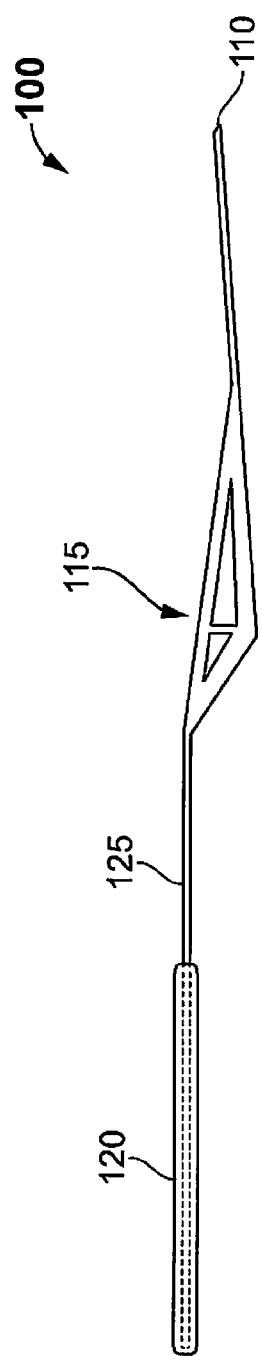
FIG. 4 shows a side view of a scoop device, in an embodiment of the present invention.
Figure 5:
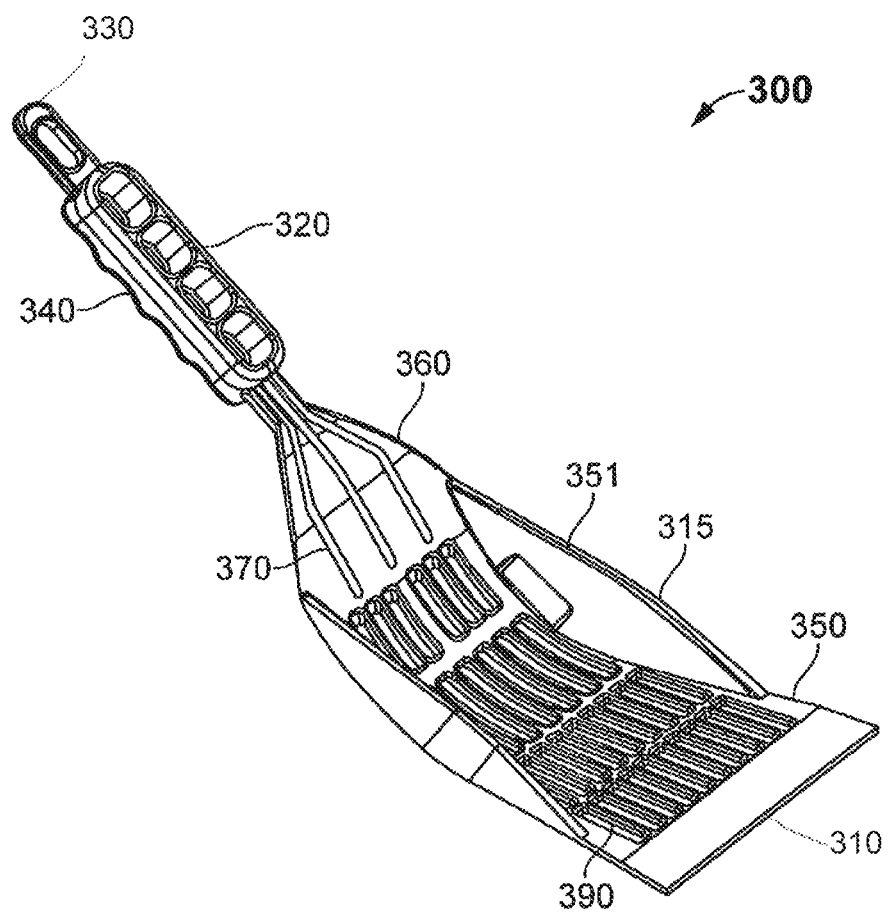
FIG. 5 shows a perspective view of a scoop device of another embodiment of the present invention.
Figure 6:
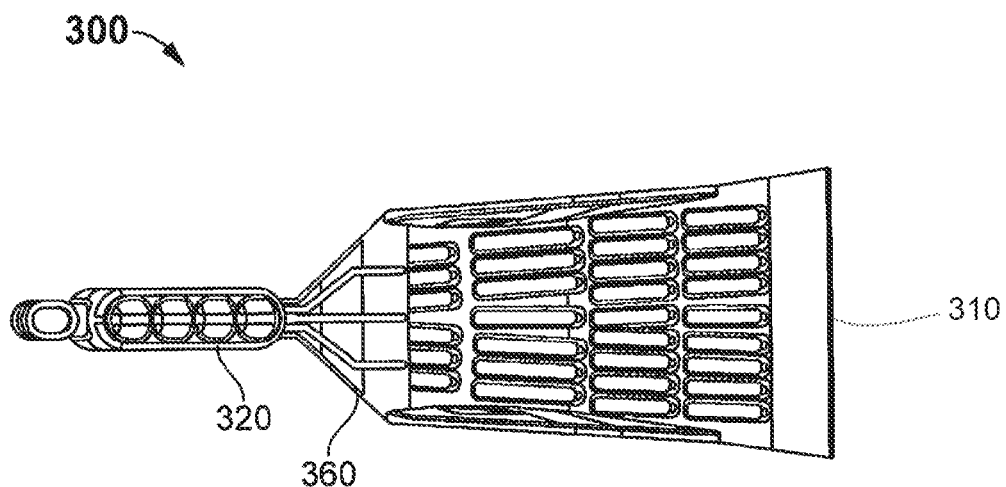
FIG. 6 illustrates a top view of the scoop device of another embodiment of the present invention.
Figure 7:
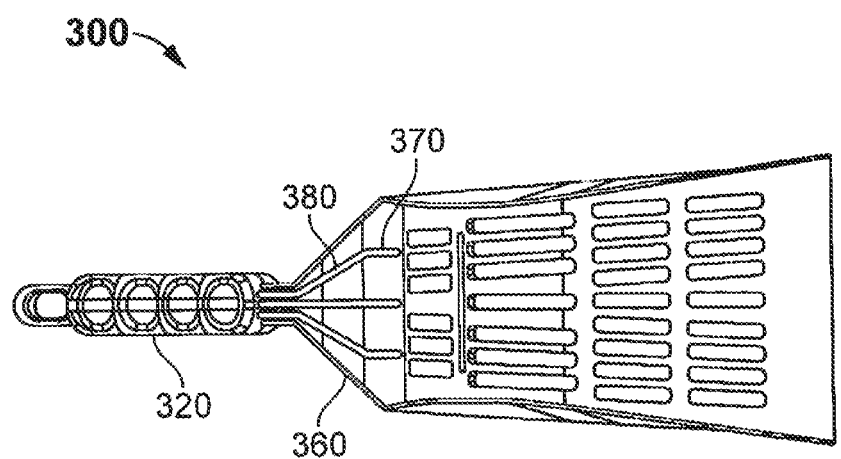
FIG. 7 illustrates a bottom view of the scoop device of another embodiment of the present invention.
Figure 8:
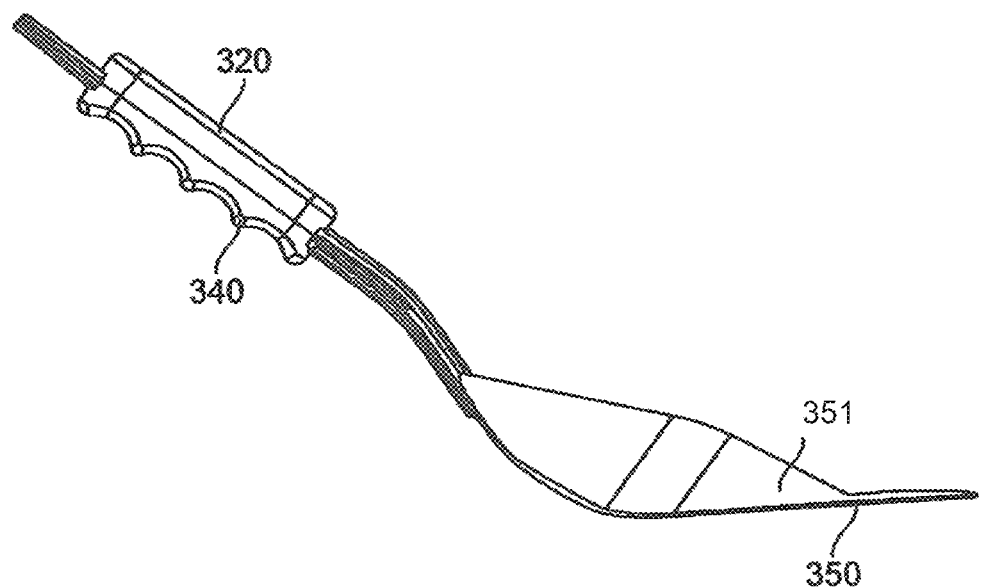
FIG. 8 illustrates a side view of the scoop device of another embodiment of the present invention.

Referring to FIG. 4, a side view of a scoop device 100 is disclosed, in an embodiment of the present invention. The scoop device 100 comprises, filter basket 115, and beveled scraper 110. The filter basket 115 and beveled scraper, or scraper 110 are coated by a non-stick material such as, Teflon®, etc. The filter basket 115 is a spatula shaped end, positioned between the handle 120 and the beveled scraper end 110 in the scoop device 100. The filter basket 115 is further extended towards to form the flat beveled scraper 110 configuration in the scoop device 100. The filter basket 115 and the beveled scraper 110 comprises one or more openings 130 that prevents scoop device 100 from capturing loose litter material. The opening 130 further allow ease in capturing urine balls or feces 104. Further, leading edge, or end of the scraper 110 of the scoop device 100 is beveled and sharpened to allow loosening of the material such as urine clump or feces, inadvertently adhering to the sides of the litter box.

In an embodiment, the manufacturing process of the scoop device 100 is also disclosed. The scoop, filter basket or basket 115, and handle tang 120 are all formed as one piece in a progressive die on a flywheel press. The die brings in 16 gauge (0.051" thick) type 304 stainless steel rolled sheet and using multiple strokes, forms the scraper 110, basket 115, and tang. After stamping, the units are subjected to vibrational deburring process with specially sized abrasive to remove burrs and round sharp edges. After this step, the leading edge is robotically ground and deburred. Then, the metal component is subjected to a robotically controlled sand blasting stage and cleaning. After a 750° F. cold working stress relief step, the foam handle location is masked, the unit is coated with polytetrafluoroethylene (PTFE), and then the coating is thermally cured at 350° C. Then, the handle mask is stripped off and the handle foam is applied and cured. The finished tool is then placed on a printed cardboard card and covered with a blister cover through which the retail buyer can see the product when it is hanging on a rod on the point-of-sale rack.

In one embodiment, the dense Ethylene Vinyl Acetate (EVA) foam bonds itself to the roughened stainless steel surface and provides a comfortable grip for the tool. The said closed cell foam surface is non-absorptive and is non-slip, providing a cushioned grip for the user. The outer surface of the foam appears as a matte finish and easy to clean if it becomes soiled. The handle 120 could be supplied in almost any vibrant color, so a distinctive color may be chosen to enhance the product recognition factor, which can dramatically improve the market adoption of the product.

The advantage of the present invention includes, a scraper 110 configuration, which provides the cat owner, or user an ease in removing and disposing the urine ball 104 intact from the litter by slicing down the wall, or along the bottom of the box. The urine ball 104 could be a perfect ball or an imperfect clump 104, the device 100 comprising scraper 110 with its beveled end, and positioned sifting slots, helps in lifting out the ball 104, and separating/segregating it cleanly from the remaining litter. The device 100 could be removed from the litter box with a slight tilt of the wrist, where the urine ball 104 is rolled into the slotted basket 115. Then, the ball or any fecal matter 104 from the device 100 could be disposed of. Further, the device 100 could be cleaned using a brush in the flushing water of the toilet. The size of the scoop device 100 is easy to manipulate through litter, and non-stick coating means. Material flexibility, an ergonomic handle 120 grip and hanger, and modern design makes it an essential tool for cat owners and caregivers. The device 100 further helps in eliminating one or more health issues, which strengthens their commitment to a cleaner environment and a better life for users and their cats.

FIGS. 5-8 illustrates a scoop device 300 as another embodiment of the present invention. The scoop device 300 includes a filter basket 315 which is positioned on one end of the scoop device 300 and a handle 320 which is positioned on an opposing end of the scoop device 300.

The handle 320 may include an opening 330 to allow the scoop device 300 to be mounted on a vertical surface and may include projections 340 to provide a gripping surface for the user of the scoop device 300.

The filter basket 315 may include a bottom wall 350 which may connect to the scraper 310, may include an opposing pair of sidewalls 351 which extends upward from the bottom wall 350 and may include a narrowing wall 360 which extends and connected to the bottom wall 350 and is connected to the handle 320. The narrowing wall 360 may include a plurality of parallel ribs 370 which may extend (parallel) along the radial axis of the scoop device 300 and a plurality of traversed ribs 380 which traverse the parallel ribs 370 along the distal axis of the scoop device 300. The parallel ribs 370 and the traversed ribs 380 strengthen the connection between the handle 320 and the filter basket 315 to prevent the scoop device 300 from bending or breaking due to a heavy load of litter and urine balls.

The bottom wall 350 may include an array of apertures 390 to allow the excess litter to drain from the filter basket 315 while retaining the urine balls to allow convenient disposal of the urine balls. The sidewalls 351 may extend upwards from the narrowing wall 360 as well as the bottom wall 350 and may or may not extend the entire length of the bottom wall 350 and/or the scraper 310.

The entirety of the scoop 300—the basket 315, bottom wall 350, and handle 320—is formed as one piece of injection molded plastic.

For the scoop 300 of the present invention to become a reality requires design by an engineer educated in the injection molding process.

Consideration is given to the components of the scoop 300 as well as its functionality, aesthetics, strength, rigidity/flexibility, and service life.

These considerations go into the creation of the mold to form the scoop 300, commonly made from a block of steel or aluminum, and reflects the attributes of the scoop 300, as well as particulars needed for the injection molding process, like the machine choice and plastic formula for the scoop 300.

The mold block is hollowed out to form a void required for the part and includes gate placement, corner transitions, scoop wall thickness, vent placement, and rib design — engineered for added strength, all required in the plastic injection part-making process.

The appropriate injection molding machine is chosen based on the size of the part, its block, and the amount of pressure needed to keep the mold closed during the injection molding process.

The plastic used to form the scoop 300, in resin form, is melted in the barrel atop the machine and then injected into the mold through a nozzle once it reaches optimum consistency.

The clamping unit holds the two halves of the mold block together under high pressure until the molten plastic completely fills the mold cavities.

Once the mold is filled, the resin must cool to form the final part, from a few seconds to almost one minute. While cooling, a screw within the machine retracts and reloads with more molten plastic in preparation for the next injection.

When the scoop 300 cools to the proper temperature, the mold opens and ejector pins push the scoop 300 out in a forward motion.

The mold then closes and the process is repeated.

The finished scoop 300 will be placed in a cellophane bag secured with a printed card stock closure with a hole for hanging on a rod on the point-of-sale rack or placed in a cardboard box for mailing out to online shoppers.

Preferred embodiments of this invention are described herein, including the best mode known to the inventors for carrying out the invention. It should be understood that the illustrated embodiments are exemplary only, and should not be taken as limiting the scope of the invention.

The foregoing descriptions comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

The invention claimed is:

1. A feline hygiene device comprising:
a proximal handle for gripping a scoop module, the scoop module comprising:
a connecting section extending from the proximal handle with a width that increases distally along a longitudinal axis, the connecting section having a plurality of parallel raised ribs distally extending parallel along the longitudinal axis and a plurality of traversed raised ribs that traverse the parallel ribs distally along the longitudinal axis;
a scooping section extending from the connecting section having parallel opposing side walls connected by a curvilinear basket portion, the curvilinear basket portion further comprising at least one aperture, the at least one aperture configured to allow loose litter material to fall through back into the litter box and retain at least one urine ball and at least one feces within the scoop device; and a distal portion extending from the curvilinear portion forming a planar top surface and a beveled distal edge.

2. A feline hygiene device as in claim 1, wherein the feline hygiene device is coated with a non-stick material.

3. A feline hygiene device as in claim 2, wherein the nonstick material is Teflon®.

4. A feline hygiene device as in claim 1, wherein the proximal handle includes an opening at an end of the proximal handle that allows the feline hygiene device to be hung up in close proximity to a litter box.

5. A feline hygiene device as in claim 1, wherein the curvilinear basket portion and beveled distal edge include at least one opening that prevents the scoop device from capturing loose litter material.

6. A feline hygiene device as in claim 1, wherein the beveled distal edge is sharpened to allow loosening of the material adhering to the sides and bottom of the litter box.

* * * * *